(12) United States Patent
Saluccio

(10) Patent No.: US 7,999,407 B2
(45) Date of Patent: Aug. 16, 2011

(54) AIR CONDITIONING COVER CONNECTING EXHAUST TO TURBINE

(75) Inventor: Raymond Saluccio, Colonia, NJ (US)

(73) Assignee: Raymond Saluccio, Colonia, NJ (US)

( * ) Notice: Subject to any disclaimer, the term of this patent is extended or adjusted under 35 U.S.C. 154(b) by 84 days.

(21) Appl. No.: 12/584,254

(22) Filed: Sep. 1, 2009

(65) Prior Publication Data

US 2011/0049893 A1    Mar. 3, 2011

(51) Int. Cl.
*F03B 13/00*    (2006.01)
*H02P 9/04*    (2006.01)
(52) U.S. Cl. ............................................ 290/54; 290/43
(58) Field of Classification Search .................... 290/44, 290/55, 43, 54; 60/398; 415/3.1
See application file for complete search history.

(56) References Cited

U.S. PATENT DOCUMENTS

| 5,512,788 | A  | * | 4/1996 | Berenda et al. | 290/55 |
| 6,201,313 | B1 | * | 3/2001 | Nakamats | 290/54 |
| 6,365,985 | B1 | * | 4/2002 | Cohen | 290/55 |
| 6,601,390 | B1 | * | 8/2003 | Yazawa et al. | 60/650 |
| 6,765,309 | B2 | * | 7/2004 | Tallal et al. | 290/55 |
| 7,001,265 | B1 | * | 2/2006 | Beaty | 454/345 |
| 7,200,005 | B2 | * | 4/2007 | Von Gutfeld et al. | 361/695 |
| 7,208,846 | B2 | * | 4/2007 | Liang | 290/1 R |

FOREIGN PATENT DOCUMENTS

WO    WO 2009/094991    * 8/2009

* cited by examiner

*Primary Examiner* — Julio Gonzalez
(74) *Attorney, Agent, or Firm* — Ezra Sutton

(57) ABSTRACT

An apparatus in the form of a transfer unit for transferring exhaust air from the condenser unit of an air conditioning system to an air fan turbine for driving it. The transfer unit includes a plastic, sound absorbing cover shroud for covering the exhaust fan of the condenser unit; a flexible air hose or duct having a first end connected to the cover shroud and a second end for connecting to the intake end of an air fan turbine. The air fan turbine has an intake end, a fan, and an exhaust end, wherein the second end of the air hose is connected to the intake end of the air fan turbine. The transfer unit also includes wiring connected to the output of the air fan turbine for transferring electricity produced by the air fan turbine to an electric storage collector and meter for collecting, storing, measuring, and using the electric energy produced. Also, an inverter may be connected between the air fan turbine and the electric storage collector.

1 Claim, 3 Drawing Sheets

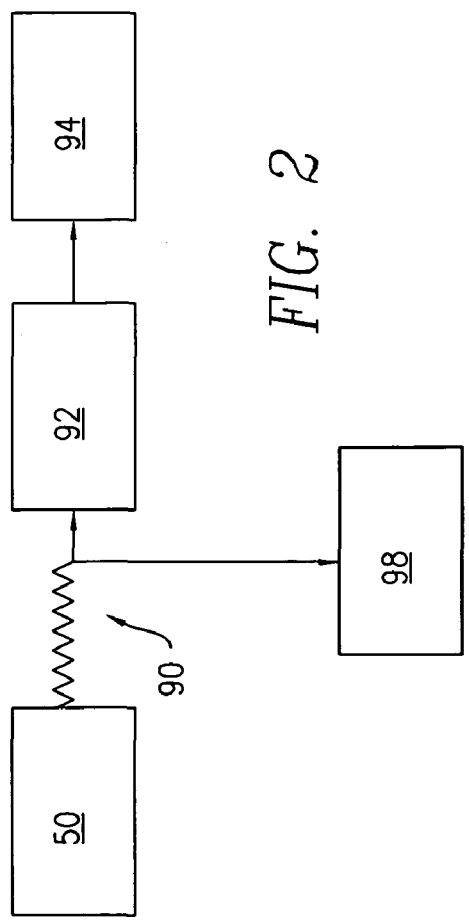
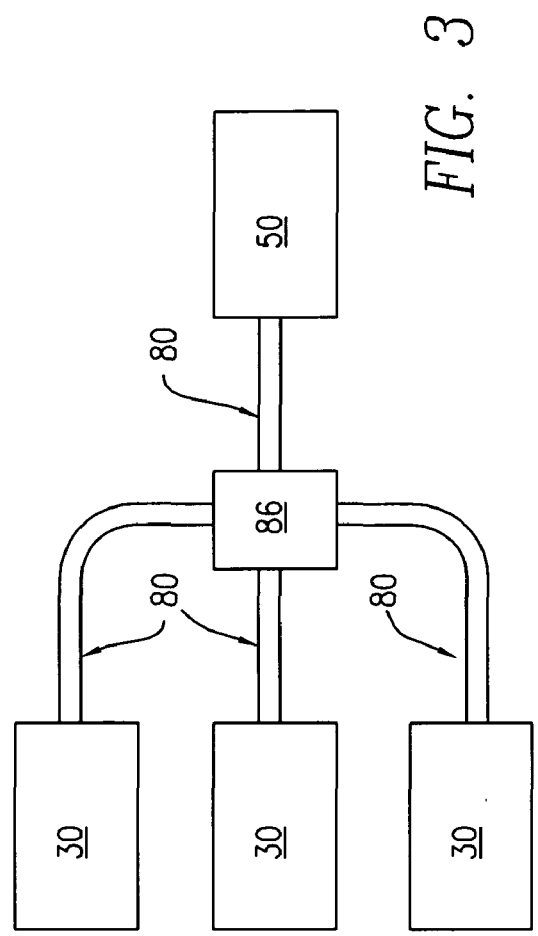

AIR CONDITIONING COVER CONNECTING EXHAUST TO TURBINE

FIELD OF THE INVENTION

The present invention relates to a system for capturing and using the exhausted airflow from the outdoor condenser units of central air conditioning systems and transforming the exhausted airflow/stream into a source of renewable electric clean energy by utilizing a second stage air fan turbine.

BACKGROUND OF THE INVENTION

Presently the outside air conditioning system has a condenser unit which is a key element in having air conditioning systems produce cool air. The condenser also produces exhaust air that is exhausted into the atmosphere and is wasted. A system is needed to collect this wasted exhaust air and convert it to reusable electric energy. It is an object of the present invention to provide such a system.

SUMMARY OF THE INVENTION

An apparatus in the form of a transfer unit for transferring exhaust air from the condenser unit of an air conditioning system to an air fan turbine for driving it. The transfer unit includes a plastic, sound absorbing cover shroud for covering the exhaust fan of the condenser unit; a flexible air hose or duct having a first end connected to the cover shroud and a second end for connecting to the intake end of an air fan turbine. The air fan turbine has an intake end, a fan, and an exhaust end, wherein the second end of the air hose is connected to the intake end of the air fan turbine. The transfer unit also includes wiring connected to the output of the air fan turbine for transferring electricity produced by the air fan turbine to an electric storage collector and meter for collecting, storing, measuring, and using the electric energy produced. Also, an inverter may be connected between the air fan turbine and the electric storage collector.

BRIEF DESCRIPTION OF THE DRAWINGS

FIG. 2 is a diagram of the electric storage collector and meter of the present invention;

FIG. 3 is a diagram of multiple condensers and multiple hoses connected to a single turbine unit.

DETAILED DESCRIPTION OF THE PREFERRED EMBODIMENT

Figure 1:
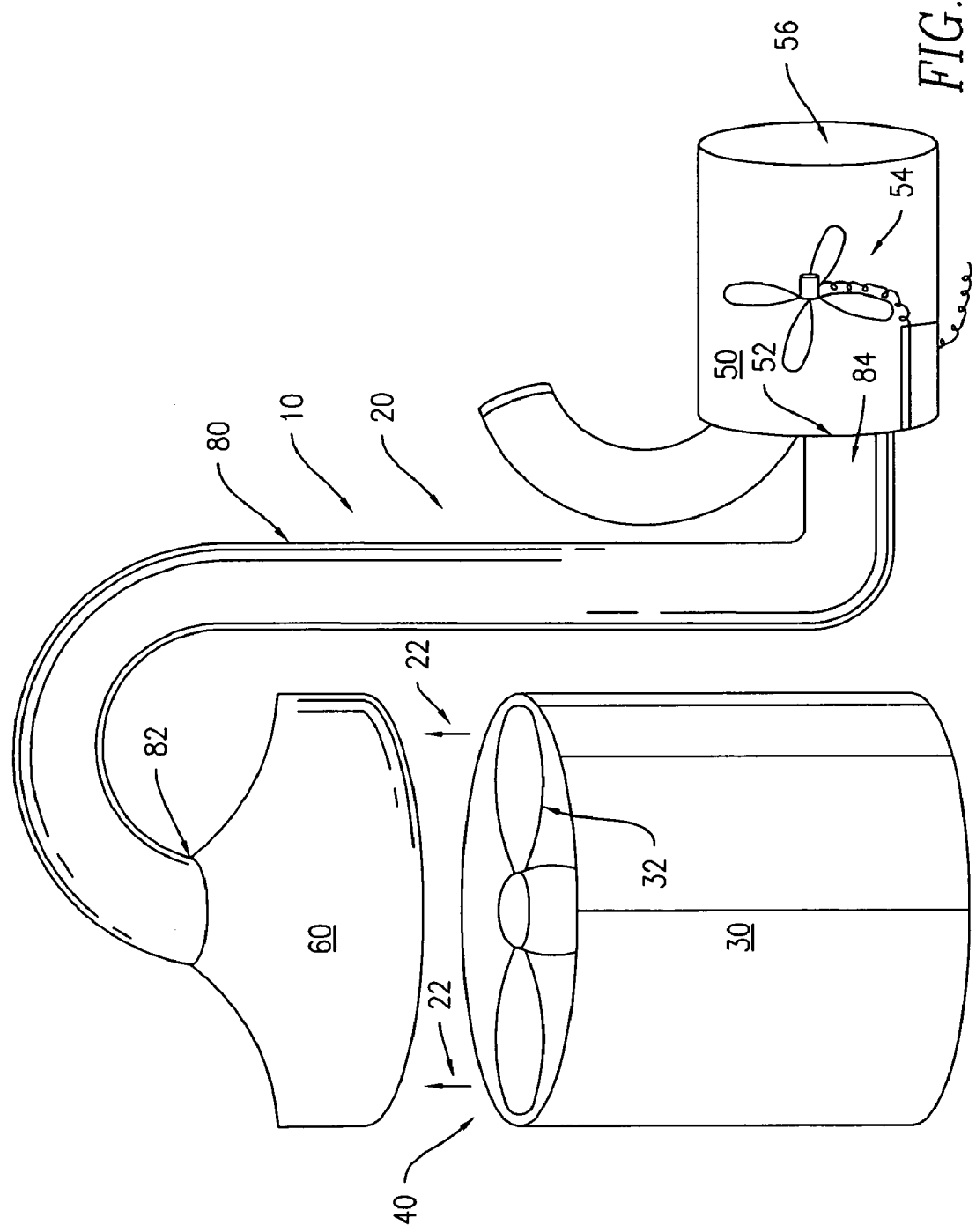
FIG. 1 is a diagram of the transfer unit of the present invention.

The new Wind Air system of the present invention receives the exhaust of warm air flow from the traditional air conditioning system and directs it to a secondary fan turbine that is driven by the exhaust air from the electric fan in the outside condensing unit of the air conditioning system. The secondary fan turbine has a generating mechanism in it that transforms the air flow exhaust from the first stage fan that is produced by the condenser units of all traditional central air conditioning systems. The secondary stage fan turbine is driven by the unobstructed airflow exhaust to produce electricity by its generating mechanism. The electricity is sent to an inverter and collector for storing the electricity. An electric meter of the home or building measures the free, clean, renewable energy.

This renewable energy has the capability to offset the increase in electric used by the air conditioning system by generating enough electricity to send it to the electric collector and meter, and thereby turning the air conditioning unit into energy producer or sub-power station. In essence, every time the central air or cooling system is turned on, the electric bill, instead of going up, will go down. This unique system using this second stage fan turbine is actually turning the typical A/C system that normally uses a lot of electricity into a system that produces renewable energy to be used in reducing energy costs.

The secondary stage fan turbine of the Wind Air system can be incorporated in the existing conventional stand alone air conditioning condensing units and can be manufactured as a complete unit as shown in the patent drawings. In a second embodiment, the adaptable version, the Wind Air stage 2 renewable energy fan turbine can be incorporated with an adaptable shroud that may be made to fit any air conditioning condenser unit in use.

An apparatus 10 is provided in the form of a transfer unit 20 for transferring exhaust air 22 from the condenser unit 30 of an air conditioning system 40 to an air fan turbine 50 for driving it. The transfer unit 20 includes a plastic, sound absorbing cover shroud 60 for covering the exhaust fan 32 of the condenser unit 30; a flexible air hose or duct 80 having a first end 82 connected to the cover shroud 60 and a second end 84 for connecting to the intake end 52 of an air fan turbine 50. The air fan turbine 50 has an intake end 52, a fan 54, and an exhaust end 56, as known in the art, wherein the second end 84 of the air hose 80 is connected to the intake end 52 of the air fan turbine 50. The transfer unit 10 also includes wiring 90 connected to the output of the air fan turbine 50 for transferring the electricity produced by the air fan turbine 50 to an electric storage collector 92 and meter 94 for collecting, storing, measuring, and using the electric energy produced. Also, an inverter 98 may be connected between the air fan turbine 50 and the electric storage collector 92 for converting from DC to AC.

In another embodiment, multiple cover shrouds 60 are connected to multiple condenser units 30 to collect the exhaust air from each condenser unit. Ducts 80 from these multiple covers 60 can all be joined to transfer the collected exhaust air into one master duct 86 for connecting to the intake end 52 of a single air fan turbine 50.

Figure 4:
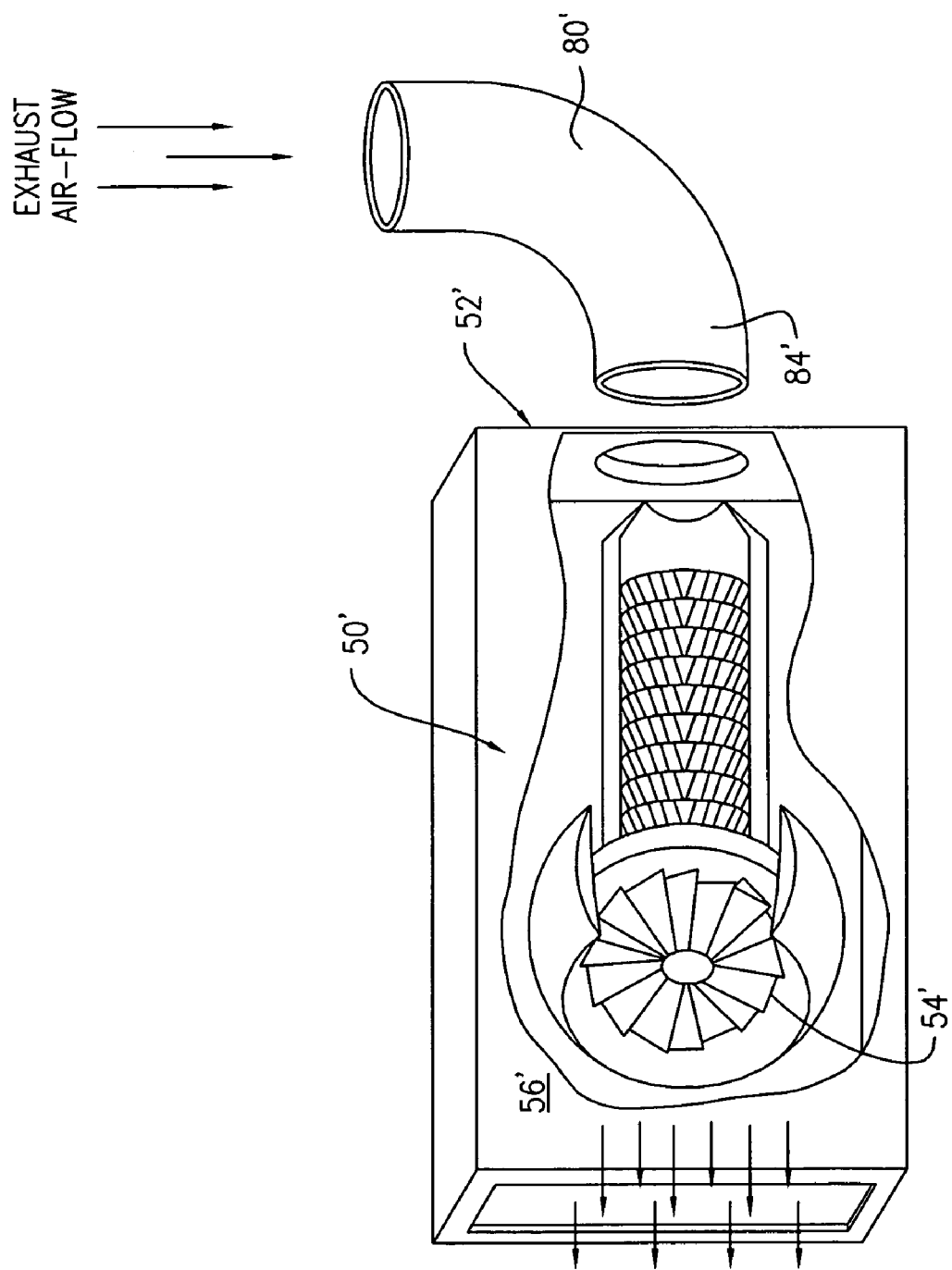
FIG. 4 is a diagram of the alternative air fan turbine.

An alternative air fan turbine 50', is shown in FIG. 4, and includes an intake end 52', a fan 54', and an exhaust end 56', as known in the art, wherein the second end 84' of the air hose 80 is connected to the intake end 52' of the air fan turbine 50'.

OPERATION OF THE PRESENT INVENTION

The Wind Air technology uses the secondary fan turbine to create new renewable energy by transferring the exhaust air stream of the A/C system to the fan turbine to produce clean/green energy. This technology can be utilized by small homeowner units all the way up to the largest commercial air conditioning applications. It is understood that by using this technology, the larger the unit, the more significant is the electrical output of clean, renewable energy. The commercialization of this technology is easy because of the novel technology of the present invention creates new energy that can be used. The potential will be realized the first time the air conditioning exhaust air is used to reduce the electric bill. This novel secondary stage fan turbine also reduces the carbon footprint and offsets the surge of electric usage that is straining power plants and sub-stations during hot summer months. It can also be viewed as a tool to save significant amounts of money on electric bills, while finding a way to keep the environment clean, and also reducing the reliance on foreign sources of power.

ADVANTAGES OF THE PRESENT INVENTION

The advantage of the present invention is that wasted exhaust air from the condenser units of air conditioning systems is collected and transferred to an air fan turbine to produce electricity, which is then re-used.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus in the form of a transfer unit for transferring exhaust air from the condenser unit of an air conditioning system to an air fan turbine for driving it to produce electricity, comprising:
   a) a plastic, sound absorbing cover shroud for covering the exhaust fan of the condenser unit;
   b) a flexible air hose or duct having a first end connected to said cover shroud and a second end for connecting to the intake end of an air fan turbine;
   c) an air fan turbine having an intake end, a fan, and an exhaust end; said second end of said air hose being connected to the intake end of said air fan turbine;
   d) wiring means connected to the output of said air fan turbine for transferring electricity produced by said air fan turbine to an electric storage collector and meter for collecting, storing, measuring, and using the electric energy produced;
   e) an inverter connected between said air fan turbine and said electric storage collector;
   f) multiple cover shrouds for covering the exhaust fans of multiple condenser units;
   g) multiple flexible air hoses are connected to said multiple cover shrouds; and
   h) said multiple flexible air hoses are connected to a main air hose, which is in turn connected to the intake end of said single air fan turbine.

* * * * *